United States Patent
Amon et al.

(10) Patent No.: US 8,954,537 B2
(45) Date of Patent: *Feb. 10, 2015

(54) APPARATUS AND METHOD FOR PROVIDING A PROVIDER-SELECTED MESSAGE IN RESPONSE TO A USER REQUEST FOR USER-SELECTED INFORMATION

(71) Applicant: Google Inc., Mountain View, CA (US)

(72) Inventors: Thomas C. Amon, Santa Ana, CA (US); Dan M. Baer, Santa Ana, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/178,663

(22) Filed: Feb. 12, 2014

(65) Prior Publication Data

US 2014/0164491 A1 Jun. 12, 2014

Related U.S. Application Data

(63) Continuation of application No. 13/412,455, filed on Mar. 5, 2012, now Pat. No. 8,700,734, which is a continuation of application No. 13/079,714, filed on Apr. 4, 2011, now Pat. No. 8,131,820, which is a (Continued)

(51) Int. Cl.
   *G06F 15/16* (2006.01)
   *H04L 29/08* (2006.01)
   *G06Q 30/02* (2012.01)

(52) U.S. Cl.
   CPC ............... *H04L 67/10* (2013.01); *G06Q 30/02* (2013.01)
   USPC ........... 709/217; 709/213; 709/219; 705/14.1

(58) Field of Classification Search
   CPC ......... H04L 67/10; H04L 29/06; H04L 67/20; H04L 67/02; H04L 69/329; G06Q 30/02; G06Q 10/103; G06Q 30/0207; G06Q 30/0277
   USPC .......................... 709/213, 217, 219; 705/14.1
   See application file for complete search history.

(56) References Cited

U.S. PATENT DOCUMENTS 5,305,195 A    4/1994   Murphy
5,347,632 A *    9/1994   Filepp et al. ................... 709/202

(Continued)

FOREIGN PATENT DOCUMENTS

WO    WO-96/39668      12/1996
WO    WO-97/21183 A    6/1997

OTHER PUBLICATIONS

About Intermind's Channel Communications Patents. Intermind Corporation, www.intermind.com. Dec. 29, 1997.

(Continued)

*Primary Examiner* — Harunur Rashid
(74) *Attorney, Agent, or Firm* — Foley and Lardner LLP; John D. Lanza

(57) ABSTRACT

A method for providing a provider-selected message in response to a user request for user-selected information is disclosed. The method includes receiving a request from a client program for user-selected information. If a provider-selected message has not been previously transmitted to the client program, the method further includes transmitting provider-selected information to the client program. If a provider-selected message has been previously transmitted to the client program, the method further includes transmitting the user-selected information. In one embodiment, the method also includes receiving a second request from the client program for the user-selected information after the provider-selected information is displayed for a limited time.

9 Claims, 2 Drawing Sheets

Related U.S. Application Data continuation of application No. 11/457,451, filed on Jul. 13, 2006, now Pat. No. 7,933,969, which is a continuation of application No. 10/001,761, filed on Oct. 31, 2001, now Pat. No. 7,110,962, which is a continuation of application No. 08/912,991, filed on Aug. 11, 1997, now abandoned.

(56) References Cited

U.S. PATENT DOCUMENTS

| | | | |
|---|---|---|---|
| 5,572,643 A | | 11/1996 | Judson |
| 5,657,390 A | | 8/1997 | Elgamal et al. |
| 5,708,780 A | | 1/1998 | Levergood et al. |
| 5,724,521 A | | 3/1998 | Dedrick |
| 5,732,219 A | | 3/1998 | Blumer et al. |
| 5,745,681 A | | 4/1998 | Levine et al. |
| 5,751,956 A | | 5/1998 | Kirsch |
| 5,754,864 A | * | 5/1998 | Hill .............................. 717/173 |
| 5,761,683 A | | 6/1998 | Logan et al. |
| 5,848,396 A | | 12/1998 | Gerace |
| 5,848,397 A | * | 12/1998 | Marsh et al. ............... 705/14.61 |
| 5,875,296 A | | 2/1999 | Shi et al. |
| 5,878,213 A | | 3/1999 | Bittinger et al. |
| 5,933,811 A | * | 8/1999 | Angles et al. .............. 705/14.56 |
| 5,937,392 A | | 8/1999 | Alberts |
| 5,948,061 A | | 9/1999 | Merriman et al. |
| 5,974,451 A | | 10/1999 | Simmons |
| 5,991,735 A | * | 11/1999 | Gerace .......................... 705/7.33 |
| 6,134,592 A | | 10/2000 | Montulli |
| 6,148,332 A | | 11/2000 | Brewer et al. |
| 6,195,649 B1 | * | 2/2001 | Gifford ........................... 705/75 |

OTHER PUBLICATIONS

Answers.com; interstitial ad and Superstitial; Oct. 26, 2005.
AOL 1996 Annual Report. AOL service. Oct. 7, 1997.
Beatty, Sally Goll. Knock, Knock! Who's There? More Noisy New Internet Ads. Wall Street Journal 0 Interactive Edition. Sep. 3, 1997.
Bezerk Awards AT&T Free Interstitial Ad in "You don't know jack the netshow" Trivia Tournament. www.berzerk.com. Mar. 5, 1997.
Boudelle, Laura. Europe waits in anticipation of E-advertising boom. ZDNN. Jun. 5, 1997.
Company Information concerning Narrative Communications. www.narrative.com. Nov. 10, 1997.
Don't be left out in the cold . . . It's time to go bezerk! www.berzerk.com. Dec. 3, 1996.
FlyCast Selects Marimba's Castanet to Bring First Real-time, Java-Based Web Advertising Campaign Management Solutions to Ad Agency Desktops. Flycast Press Release on the Web. www.flycasl.com. Aug. 4, 1997.
Foster, Can mixing 'cookies' with online marketing be a recipe for heartburn?, Jul. 22, 1996, InfoWorld, Framingham, vol. 18, Issue 30, pp. 5411.
Hodges, Jane, "N.Y. Times sets an aggressive Web plan", Advertising Age, Midwest region edition, vol. 67, issue 4, Jan. 22, 1996, p. 26, Jan. 1996.
Interstitial Advertising. Apr. 10, 1997. www.nytimes.com/library/cyber/weekl041997.html.
Java Fuels New Ads. Internet World. Dec. 1997.
Keane, Patrick. In the Face of Shrinking Nielson Ratings, Major Television Networks Need to Re-Evaluate Online Goals. www.jupiter.com. Jun. 2, 1997.
Kohda Y et al., "Ubiquitous Advertising on the www: merging advertising of the browser" computer networks and ISDN Systems, North Holland Publishing; Amsterdam, NL, vol. 28, May 1996 pp. 1493-1499. xp002037594; ISSN: 0169-7552.
Lemos, Robert. Web Advertising's Future: Users in Limbo. ZDNN. Jun. 27, 1997.
Lemos, Robert. Web Surfers Cruising by Boring Banner Ads. ZDNN. Jun. 11, 1997.
Made-Over AOL-looks more like TV. Register News Service. Oct. 7, 1997.
Notice of Allowance on U.S. Appl. No. 10/001,761 dated Apr. 4, 2006.
Notice of Allowance on U.S. Appl. No. 11/457,451 dated Dec. 21, 2010.
Notice of Allowance on U.S. Appl. No. 13/079,714 dated Nov. 7, 2011.
Office Action on U.S. Appl. No. 10/001,761 dated Nov. 4, 2005.
Office Action on U.S. Appl. No. 10/001,761 dated May 5, 2005.
Office Action on U.S. Appl. No. 10/001,761 dated Jun. 9, 2004.
Office Action on U.S. Appl. No. 10/001,761 dated Sep. 13, 2004.
Office Action on U.S. Appl. No. 11/457,451 dated Feb. 25, 2010.
Office Action on U.S. Appl. No. 11/457,451 dated May 18, 2010.
Office Action on U.S. Appl. No. 11/457,451 dated Sep. 29, 2009.
Office Action on U.S. Appl. No. 11/457,451 dated Sep. 8, 2010.
Office Action on U.S. Appl. No. 13/079,714 dated Sep. 14, 2011.
Pushing Push: Advancing the Features of Channel Communications. Intermind Corporation, www.intermind.com. Sep. 8, 1997.
Richtel, Matt. TV-Type Ads Emerge on the Web. The New York Times. CyberTimes. Apr. 19, 1997.
Taylor, Going beyond the banner, Jul. 8, 1996, Brandweek, New York, vol. 37. Issue 28, pp. 122.
The New York Times on the Web, Frequently Asked Questions About Cookies III www.nytimes.com/subscribe/help/cookies.html, 2000.
The New York Times on the Web, "Privacy Information", www.nytimes.com/subscribe/help/privacy.html, 2000.
The New York Times on the Web, Thursday, Sep. 7, 2000 issue, www.nytimes.com, front page, sign in page, Late News page, Sep. 2000.
US Notice of Allowance on U.S. Appl. No. 13/412,455 DTD Nov. 25, 2013.
US Office Action on U.S. Appl. No. 13/412,455 DTD May 29, 2013.

* cited by examiner

APPARATUS AND METHOD FOR PROVIDING A PROVIDER-SELECTED MESSAGE IN RESPONSE TO A USER REQUEST FOR USER-SELECTED INFORMATION

This application is a Continuation of U.S. application Ser. No. 13/412,455, filed Mar. 5, 2012, incorporated herein by reference in its entirety, which is a Continuation of U.S. application Ser. No. 13/079,714, filed Apr. 4, 2011, now U.S. Pat. No. 8,131,820, incorporated herein by reference in its entirety, which is a Continuation of U.S. application Ser. No. 11/457,451, filed Jul. 13, 2006, now U.S. Pat. No. 7,933,969, incorporated herein by reference in its entirety, which is a Continuation of U.S. application Ser. No. 10/001,761, filed Oct. 31, 2001, now U.S. Pat. No. 7,110,962, incorporated herein by reference in its entirety, which is a Continuation of U.S. application Ser. No. 08/912,991, filed Aug. 11, 1997, incorporated herein by reference in its entirety.

BACKGROUND

Internet information services differ in a number of ways from traditional broadcast services such as television and radio. These differences make it much more difficult for the internet information services provider to attract the attention of the internet user to messages that the internet user has not actively sought, such as commercially sponsored messages, than has been the case with traditional broadcast services.

One such difference is that the internet user normally controls the channel to her receiving equipment, typically a computer. The internet user therefore may play an active role in selecting information resources transmitted. In contrast, in traditional broadcast media, the user has no control at all over the channel, and may select information resources only by receiving or not receiving (such as by changing the channel) information placed on the channel by the broadcaster.

Further, in traditional broadcast media, transmissions are often used by the recipient without the assistance of content storage or processing equipment, which might permit the user to avoid or minimize exposure to unwanted or uninteresting information from the transmission. The user of traditional broadcast media therefore generally cannot direct his or her attention only to desired portions of the transmission without interrupting the viewing process. The user therefore normally views most or all information intended for the viewer by the broadcaster while viewing a broadcast. The user's viewing process is substantially under the control of the broadcaster.

For example, a traditional broadcast typically includes programming to induce users to tune the broadcast channel. In order to derive revenue from the broadcast, the broadcaster typically intersperses commercial sponsored messages, which the user may not desire to view, with the programming which the viewer seeks. Because the user does not control the channel, the user has no choice but to receive commercial messages interspersed with the program while tuned to the channel. If the program is viewed as received, the viewer further must either view such commercial messages or interrupt viewing the channel altogether, perhaps by tuning another channel.

Internet users, unlike broadcast users, may exercise control over the channel to their receiver. Unlike a broadcast, in which a stream of information is transmitted without regard to any user's desire to receive it, Internet information is typically transmitted only in response to a request.

Like broadcasters, internet information providers often desire to intersperse commercially sponsored messages with information sought by users, hoping to induce users to view the commercially sponsored messages along with user-selected information. However, internet users receive requested information in digital form and store and/or process some or all of the requested information on computers before or during the viewing process. As a result, internet information providers typically exercise far less control over the viewing process than do broadcasters, and unwanted or uninteresting content may be easily ignored or avoided by the internet user. It is thus more difficult for internet information providers to effectively deliver commercially sponsored messages to internet users than for traditional broadcasters.

For example, internet search service providers often display so-called banner advertisements on the same page with search results. Experience has shown, however, that search service users often focus only on retrieved search results and ignore displayed banner advertisements.

For the foregoing reasons, there is a need for an improved internet messaging system that permits the internet information provider greater control over the user's viewing process of provider-selected messages, without otherwise interfering with the viewing process of user-selected information.

SUMMARY

The present invention is directed to an improved internet messaging system that satisfies the need for providing the internet information provider greater control over the viewing process of provider-selected messages. The system comprises an apparatus and method for providing a provider-selected message in response to a user request for user-selected information.

An object of the present invention is to provide a method and apparatus for conveying information to the internet user that the user has not selected interspersed with information that the user has selected in such a way that the user has difficulty ignoring or avoiding such unselected information without interrupting the viewing process.

A further objective of the present invention is to provide a method and system for substantially controlling the viewing process during the display of a time-delimited provider-selected message as a prerequisite to permitting the user to retrieve user-selected information.

A further objective of the present invention is to monitor the transmission of user-selected information to a user, and to intersperse provider-selected information with user-selected information at intervals under the control of the information service provider.

These and other objectives are accomplished by the present invention.

A system having the features of the present invention comprises an internet server for receiving a user request for user-selected information, and for determining if a qualified provider-selected message has previously been transmitted to the user. The server transmits provider-selected information (such as a commercial message) in response to the user request if no qualifying provider-selected message has been previously transmitted to the user.

Such a system may further comprise a provider-selected message which causes the user's computer to automatically again request the user-selected information that resulted in transmission of the provider-selected message, after an appropriate display interval. Such a provider-selected message may be a qualifying provider-selected message, in which case the automatic request for user-selected information will result in the transmission of the originally sought user-selected information. During the display interval, the provider may substantially control the user's client program.

DETAILED DESCRIPTION OF THE INVENTION

Figure 1:
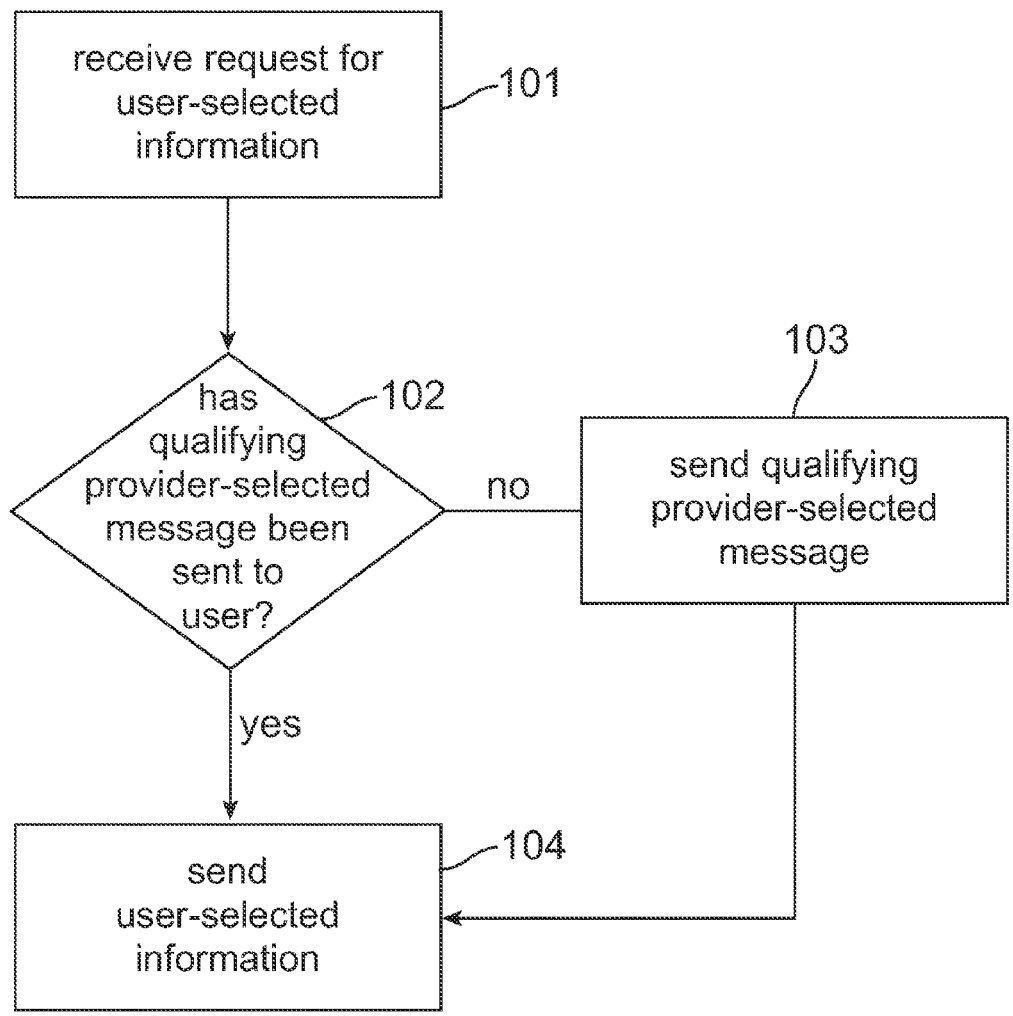
FIG. 1 is a flowchart showing a method of the present invention.

A method and system for interspersing messages not selected by the user with user-selected messages is disclosed.

Internet information services are typically provided via client/server programs, in which a client program executing on a user's computer is used to request information services from a server program executing on an information service provider's computer. In one popular method, information and requests are transmitted via the so-called HyperText Transport Protocol ("HTTP"). Users' HTTP client programs are typically known as "browsers" and commercial embodiments are available from Netscape and Microsoft, among others. HTTP server programs operated by information service providers respond to users' browsers' HTTP requests. Commercial HTTP server embodiments (frequently referred to as "web servers") are available from Microsoft and Netscape, and royalty-free embodiments are available from NCSA, CERN and Apache.

In addition to sending HTTP requests and receiving HTTP responses from servers, typical browsers parse certain classes of such responses, including Standardized General Markup Languages, most commonly including Hypertext Markup Language ("HTML"). In addition, many common browsers can parse and execute program code transmitted in HTTP responses. For example, two programming languages commonly executed by browsers are SunSoft's JAVA language and Netscape's JAVASCRIPT language.

HTTP requests and responses frequently include a wide variety of information, often in conjunction with user-requested information. Such other information is often transmitted in HTTP header fields. Such header fields are generally of four types: General Headers, Request Headers, Response Headers and Entity Headers.

General Headers may include such information as, for example, the transfer-encoding scheme. Request Headers may include such information as, for example, encoding schemes the client program can accept, name=value pairs known as "cookies", or the "referrer" or URL of the document containing the link selected by the user to cause the browser to request the requested document. Response Headers may include such information as, for example, the age of the requested document or a "Set-Cookie" header used to define cookie name=value pairs. Entity Headers may include such information as, for example, the content encoding scheme, content length or a message digest such as MD5. More comprehensive descriptions of commonly used headers appear in RFC 1945 and Wong, Web Client Programming with Perl (1997, O'Reilly & Associates, Inc.)

Browser and other HTTP clients address information with Universal Resource Locators ("URL"s). HTML documents generally contain user-selectable references to such URL references, along with hypertext or graphical labels for the user-selectable reference or "link." HTML provides a markup token or tag known as an anchor, which links a displayed image or text segment with a URL so that when a user selects the linked image or text (the "link"), the browser client causes the computer to transmit an HTTP request for the information referenced by the linked URL. Some systems permit users to store links locally as "bookmarks," allowing a user to go directly to "bookmarked" pages without directly entering a URL or selecting a link on a transmitted page.

Prior art forms of commercial messaging have included placing advertisements such as the rectangular so-called "banner ad" on an HTML page with user-selected information, or providing an HTML page containing advertisements with a link to a page containing user-selected information. In the case of a banner ad, because the user-selected page contains both information sought by the user and provider-selected information not sought by the user, the user may ignore the provider-selected information not sought and direct her attention only to the information sought. In the case of an intermediate link, the user may simply enter the URL of the user-selected page directly, or "bookmark" the page, and thus entirely bypass the commercial message when the user returns to the page.

In the present invention, a user selecting a link does not receive user-selected information unless the information provider's server determines that the user has previously received a qualifying provider-selected message. The provider-selected message need not contain any user-selected information, and is thus substantially under the control of the provider. Nevertheless, because the server will not permit the user to retrieve user-selected content unless the user has previously received a qualifying provider-selected message, the user who sufficiently desires user-selected information available from the provider will nevertheless receive and likely will view provider-selected information.

A provider-selected message may be any form of message capable of transport via computer network, including any form of message capable of transport via the HTTP protocol. Because the provider-selected message display need not contain user-selected information, the provider-selected display is substantially under the control of the information provider.

State information sufficient to determine whether a given user has previously received a qualifying provider-selected message may be maintained by the information provider or by the user, or both.

For example, a user request may contain sufficient information for a server which maintains no state information for the requesting user to determine that the user has previously received a qualifying provider-selected message. One such user request is an HTTP request including a cookie indicating the time and nature of the last provider-selected message received by the user's browser. Such a request would permit the provider's server to determine if the user had received a provider-selected message which was qualifying because, for example, the user had received a commercially sponsored message within the last one-half hour. A user frequently requesting information from such a server would receive a commercially sponsored message every one-half hour.

Alternatively, the state information could be divided between the user and the provider. For example, a user request could contain sufficient information for the provider only to identify the user, and all other state information relating to that user could be maintained by the provider. One such user request is an HTTP request including a cookie name/value pair assigning a unique number to each separate browser by the server. Using the identification number, the provider's server could access a database containing information about the user, such as the time and nature of the last provider-selected message transmitted to the user. One such embodiment utilizes Microsoft Internet Information Server's Active Server Page technology to set a unique cookie for each user and to associate a session variable with each user indicating the time that the user last received a qualifying provider-selected message. Based on such information, the server could permit the user to retrieve user-selected information only if, for example, the user had received a commercially sponsored message in the last one-half hour.

Alternatively, all state information may be maintained by the provider. For example, a provider's server could maintain a database of provider-selected messages transmitted in the last one-half hour and the network addresses of the machines and programs that received those messages. If a user request is received from a network address on the list, user-selected information would be transmitted in response. Otherwise, a provider-selected message would be transmitted in response.

One method for practicing the present invention is shown in FIG. 1. In step 101, the internet information server receives a user request for user-selected information. In step 102, the server determines the qualification state of the requestor using state information available to the server at the time that the server responds to the request, such as the state information described above. If the server determines in step 102 from the available state information that no qualifying provider-selected message has previously been sent to the requestor, then the server performs the step 103 of sending a qualifying provider-selected message to the requestor. The server then performs the step 104 of sending the requested user-selected information to the requestor. If the server determines in step 102 that a qualifying provider-selected message has previously been sent to the requester, then the server may perform step 104 after step 101 without performing step 103 in the interim.

In a preferred embodiment, request information is structured so as to inhibit a user from falsely indicating that she has fulfilled the provider's requirements for access to user-selected information.

Qualification conditions may be dynamic, and are determined at the time that the server responds to a user request. For example, a qualifying interval in the above example might be one-half hour from midnight to five o'clock p.m. and then change automatically to fifteen minutes from five o'clock p.m. to midnight. Alternatively, a qualifying interval might vary based on other information available to the server, such as the user's browser program type, or user information maintained by the server.

User-selected information can only be accessed by a user who receives messages substantially under the control of the provider of the user-selected information at intervals and on conditions under the continuous control of the provider.

Figure 2:
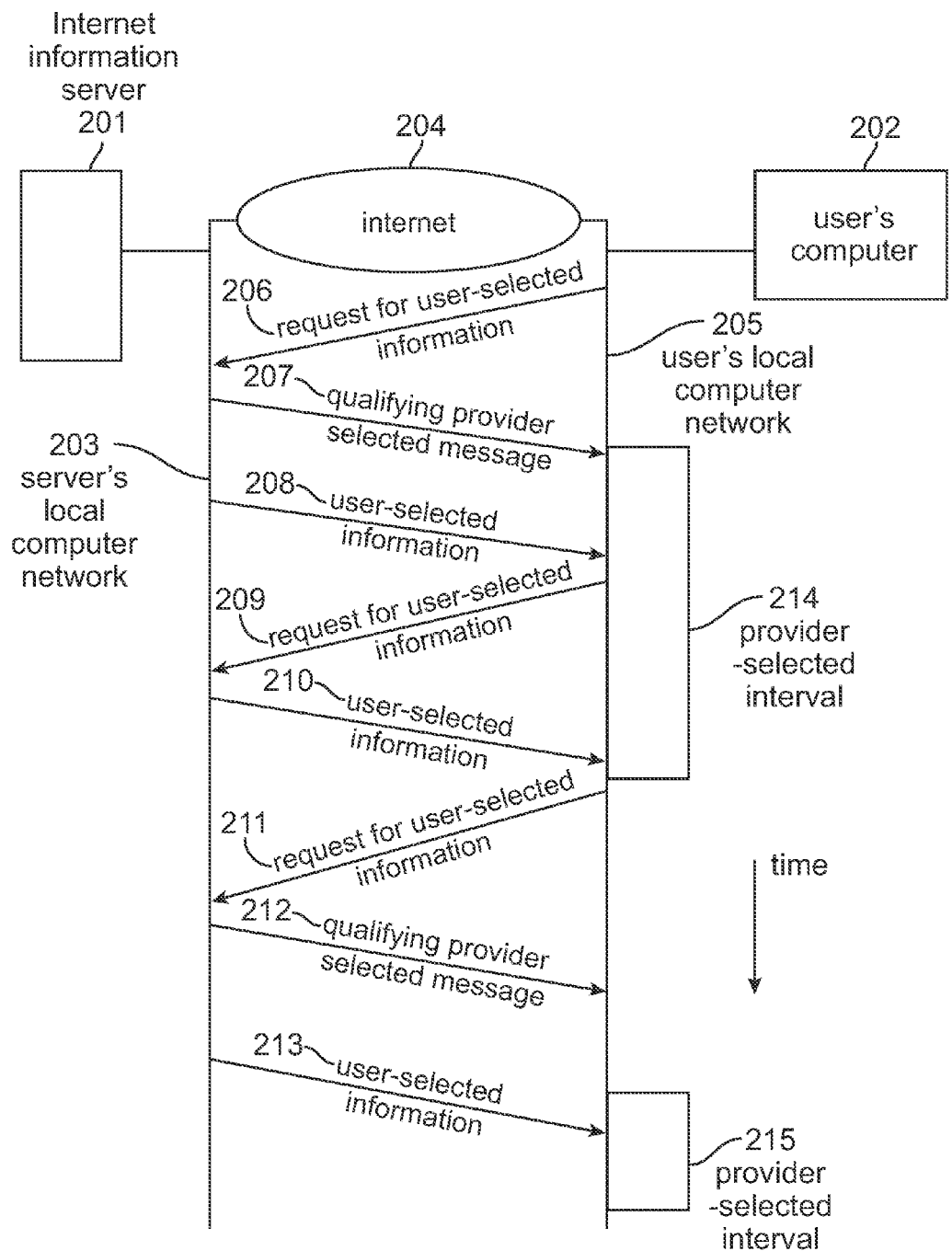
FIG. 2 is a schematic showing exchange of requests and responses in accordance with an embodiment of the present invention.

FIG. 2 schematically depicts one embodiment of the present invention. An internet information server 201 is provided, which may comprise, for example, an IBM compatible computer containing an Intel PENTIUM chip, running the Microsoft Windows NT operating system and Microsoft Internet Information Server HTTP server software. The server is connected by means of a network adapter to a local computer network 203, which is in turn connected to the Internet 204. A user computer 202 is also depicted, which may comprise, for example, an IBM compatible computer containing an Intel PENTIUM chip, running the Microsoft Windows 95 operating system and Netscape Navigator HTTP browser client software. The user computer is connected by means of a network adapter to a local computer network 205, which is in turn connected to the Internet 204. By means of the local computer networks 203 and 205 and the Internet 204, the internet information server 201 accepts requests from the client program running on user computer 202 and delivers information to the client program in response to such request.

One form of exchange of requests and responses is also depicted in FIG. 2. Initially, a user's client program causes user's computer 202 to transmit a first request 206 for user-selected information to the internet information server 201 via the user's local computer network 205, the Internet 204, and the local computer network 203 of the internet information server 201. After ascertaining that the user has not previously received a qualifying provider-selected message, the internet information server 201 responds to the user request by transmitting a qualifying provider-selected message 207 to the user's computer across the server's local computer network 203, the internet 204 and the user's local computer network 205.

After an appropriate period (determined by the server) of time, the user becomes qualified by virtue of having been sent a qualifying provider-selected message 207 (and perhaps fulfilling some additional conditions) within a provider-selected interval 214. The server 201 then transmits the requested user-selected information 208 to the user's computer.

The server responds to additional requests for user-selected information (such as request 209 received during a provider-selected interval 214 from a qualified user) with user-selected information 210, without transmitting a second qualifying provider-selected message. In a preferred embodiment, separate provider-selected intervals may be associated with each qualifying provider-selected message. Additional requests for user-selected information received outside of the provider-selected interval 214 such as 211 cause the transmission of another qualifying provider-selected message such as 212, and are followed by additional provider-selected intervals such as 215. Such additional provider-selected intervals may be of varying lengths, and may begin after different periods of time following the transmission of an associated qualifying provider-selected message.

In a preferred embodiment, provider-selected messages are time-delimited and are displayed for only a limited period, after which user-selected information is automatically displayed.

For example, in a preferred embodiment, transmission of a qualifying provider-selected message may be followed after a limited display period by transmission of the original user-selected information. In one such embodiment, a qualifying provider-selected HTTP message is transmitted to a JAVASCRIPT-enabled browser such as Netscape 3.0. The HTTP message includes HTML and JAVASCRIPT which causes the provider-selected HTML to be displayed for a limited period, after which time the browser automatically requests the originally sought user-selected information from the provider's server which is then transmitted in response.

In a preferred embodiment, the user may be able to access other provider-selected information during the display of a time-delimited message, for example, by following a link provided in an HTML document included in the time-delimited message, but the user may not access the user-selected information.

A variety of other timed-delimited provider-selected message embodiments will be apparent to those skilled in the art. For example, a provider-selected interval during which a user is qualified to receive user-selected information may not begin until after the expiration of a minimum delay period. Such a qualifying provider-selected interval may be utilized with a provider-selected message that causes a user's browser to request user-selected information after displaying the provider-selected message for a display period that exceeds the minimum delay period.

One such provider-selected message includes an HTML tag such as: <META HTTP_EQUIV="REFRESH" CONTENT="15; URL=http://www.provider.com/user-selected.html"> which causes the user's browser to request the information addressed by the URL http://provider.com/user-selected.html after displaying the parsed html page for 15 seconds. If the provider establishes a qualifying interval that begins fifteen seconds after the HTML message is received by the user, then the user will automatically receive user-selected information after the parsed HTML has been displayed for fifteen seconds. Moreover, the user will be unable to retrieve the user-selected content until such fifteen seconds has elapsed. Fifteen seconds is merely exemplary; any delay may be specified.

If no minimum delay is set on the server, time display messages can nevertheless be used. However, a user seeking to avoid the provider-selected message may be able to shorten the display period by directly entering or using a "bookmark" to request the user-selected information a second time immediately after the server transmits the provider-selected message.

The user's ability to bypass provider-selected messages for user-selected information with no minimum delay can be removed by transmitting user-selected information only in response to a request by the provider-selected message.

Commonly available browsers such as Netscape and Microsoft Internet Explorer use the HTTP GET request method for bookmarked requests. By transmitting user-selected information only in response to HTTP POST request methods, bookmarking of user-selected information can be avoided.

Nevertheless, it is possible with many browsers for a user to directly enter a request using the HTTP POST request method. While such a request typically cannot be bookmarked, if the user can type the request into the browser quickly enough, the display period could be shortened by manual entry of the POST request. This can be avoided by use of the referrer header. By transmitting user-selected information only in response to a POST request including a referrer header having the URL of the provider-selected message, the provider can prevent a user from shortening the display period for the provider-selected message by bookmarking or manually entering the URL of the user-selected content.

In a preferred embodiment, these techniques may be combined to assure that a provider-selected message is actually displayed by a user's browser for a provider-selected display period before user-selected information is retrieved. In one such embodiment, a qualifying provider-selected HTTP message includes HTML and javascript which causes the provider-selected HTML to be displayed for a limited period, after which the browser automatically requests the originally sought user-selected information from the provider's server, using the HTTP Post request method. The provider's server transmits user-selected information only in response to such a request using the POST method, and which in addition includes a referrer header indicating that the referrer is a URL for a qualifying provider-selected message. In combination with a qualification condition requiring, for example, that the last provider-selected message has been received within the last one-half hour, this embodiment would permit the provider to ensure that the user received and displayed a fifteen second commercial message during each half hour that the user requested information.

What is claimed is:

1. A method of delivering information across a computer network, comprising:

receiving, at a web server, a first request from a client program for user-selected information;

determining, at the web server, if a provider-selected message has been previously transmitted to the client program within a first time period determined by the web server;

receiving, at the web server, a second request for user-selected information after the first time period determined by the web server;

determining, at the web server, that a second provider-selected message has not been previously transmitted to the client program within a second time period determined by the web server, the second time period different from the first time period, the second provider-selected message comprising an HTML document having a link associated with the user-selected information;

transmitting, from the web server, the second provider-selected message to the client program for display, the second provider-selected message being configured to cause the client program to transmit a third request for the user-selected information;

receiving, at the web server, the third request; and transmitting, from the web server based on a determination that the third request originated from the second provider-selected message and comprises a request including a referrer header having the address of the provider-selected message, the user-selected message to the client program for display.

2. The method of claim 1, the second provider-selected message configured to cause the client program to display the second provider-selected message for a limited time, and the method comprising:

receiving, at the web server, the third request; and transmitting, from the web server, in response to the third request, the user-selected information to the client program for display.

3. The method of claim 1, wherein the time period determined by the web server begins a third time period after transmission of the provider-selected message, and wherein the second time period determined by the web server begins a fourth time period after transmission of the second provider selected message, the third time period different from the fourth time period.

4. A non-transitory computer-readable storage medium having machine instructions stored therein, the instructions being executable by a processor to cause the processor to perform operations comprising:

receiving, at a web server, a first request from a client program for user-selected information;

determining, at the web server, if a provider-selected message has been previously transmitted to the client program within a first time period determined by the web server;

receiving, at the web server, a second request for user-selected information after the first time period determined by the web server;

determining, at the web server, if a second provider-selected message has been previously transmitted to the client program within a second time period determined by the web server, the second time period different from the first time period, the second provider-selected message comprising an HTML document having a link associated with the user-selected information;

transmitting, from the web server, the second provider-selected message to the client program for display, the second provider-selected message being configured to cause the client program to transmit a third request for the user-selected information;

receiving, at the web server, the third request; and transmitting, from the web server based on a determination that the third request originated from the second provider-selected message and comprises a request including a referrer header having the address of the provider-selected message, the user-selected message to the client program for display.

5. The computer-readable storage medium of claim 4, the second provider-selected message configured to cause the client program to display the second provider-selected message for a limited time, and the method comprising:

receiving, at the web server, the third request; and transmitting, from the web server, in response to the third request, the user-selected information to the client program for display.

6. The computer-readable storage medium of claim 4, wherein the time period determined by the web server begins a third time period after transmission of the provider-selected message, and wherein the second time period determined by the web server begins a fourth time period after transmission of the second provider selected message, the third time period different from the fourth time period.

7. A web server for delivering information across a computer network, the web server being connected to a client computer through the Internet, the web server being configured to:

receive a first request from a client program for user-selected information;

determine if a provider-selected message has been previously transmitted to the client program within a first time period determined by the web server;

receive a second request for user-selected information after the first time period determined by the web server;

determine if a second provider-selected message has been previously transmitted to the client program within a second time period determined by the web server, the second time period different from the first time period, the second provider-selected message comprising an HTML document having a link associated with the user-selected information;

transmit, from the web server, the second provider-selected message to the client program for display, the second provider-selected message being configured to cause the client program to transmit a third request for the user-selected information;

receive, at the web server, the third request; and transmit, from the web server based on a determination that the third request originated from the second provider-selected message and comprises a request including a referrer header having the address of the provider-selected message, the user-selected message to the client program for display.

8. The web server of claim 7, the second provider-selected message configured to cause the client program to display the second provider-selected message for a limited time, and the web server configured to:

receive the third request; and transmit in response to the third request, the user-selected information to the client program for display.

9. The web server of claim 7, wherein the time period determined by the web server begins a third time period after transmission of the provider-selected message, and wherein the second time period determined by the web server begins a fourth time period after transmission of the second provider selected message, the third time period different from the fourth time period.

* * * * *